Feb. 24, 1948.  F. A. BARNES  2,436,373
MACHINE TOOL CONTROL
Filed June 30, 1944  3 Sheets-Sheet 1

Inventor
FREDERICK A. BARNES
By Raymond D. Jenkins
Attorney

Feb. 24, 1948.  F. A. BARNES  2,436,373
MACHINE TOOL CONTROL
Filed June 30, 1944  3 Sheets-Sheet 2

Inventor
FREDERICK A. BARNES
By Raymond D. Jenkins
Attorney

Feb. 24, 1948.  F. A. BARNES  2,436,373
MACHINE TOOL CONTROL
Filed June 30, 1944  3 Sheets-Sheet 3

Inventor
FREDERICK A. BARNES
By Raymond D. Jenkins
Attorney

Patented Feb. 24, 1948

2,436,373

UNITED STATES PATENT OFFICE 2,436,373

MACHINE TOOL CONTROL

Frederick A. Barnes, Cleveland Heights, Ohio, assignor to Bailey Meter Company, a corporation of Delaware Application June 30, 1944, Serial No. 542,920

11 Claims. (Cl. 90—62)

This invention relates to duplicators for controlling the operation of a material forming machine so that a work piece is formed to a contour or configuration determined by a template, pattern, sample, cam or the like.

One of the objects of my invention is to improve the sensitivity of contour control of the type described and to thereby increase the accuracy with which the work piece is formed.

A further object of my invention is to provide a contour control of materially simpler construction than those now available.

In accordance with my invention the template or cam for producing the desired configuration on the work piece is scanned by a tracer regulating a jet of fluid from a nozzle to the atmosphere. Variations in the shape of the template cause corresponding changes in the rate of fluid discharged from the nozzle, which variations are then used to control the relative positioning of the tool and work piece.

Further, in accordance with my invention the changes in fluid pressure control the relative positioning of the tool and work piece through a hydraulic relay and servo-motor to the end that ample power is available for accurately positioning the tool relative to the work piece, or vice versa. The relative rates of movement of the tool and work piece in two or more directions are simultaneously controlled so that the rate of cutting speed of the tool remains substantially constant regardless of changes in contour or profile of the template, pattern or cam.

A particular feature of the present invention resides in the provision of an improved tracer mechanism for use with the general system described and claimed in the copending application of Clarence Johnson, Serial No. 524,707, and my copending application, Serial No. 524,705.

Obviously a duplicator or contour control of the type forming the subject matter of my invention may be employed with material forming machines or machine tools of various types such as milling machines, lathes, slotters, planers, die sinking machines or other machines in which the relative feed between the tool and the work may be suitably controlled. By way of example I illustrate and will describe my invention as applied particularly to metal turning lathes. Further applications and modifications of my invention will be readily apparent.

As is well understood by those familiar with the art, in some machine tools such as lathes the tool is moved longitudinally and transversely of the work piece which, except for rotation about its center, remains stationary. In other machine tools such as some types of milling machines the work piece may be moved in two directions while the tool, except for rotation about its axis, remains stationary. In some other types of milling machines and usually in die sinking machines, the tool may be moved in one or more directions and the work piece may also be moved in one or more directions. In all instances it will be observed, however, that it is the relative movement between the tool and work piece that causes the work piece to be formed to a desired shape. As one specific embodiment I have chosen to illustrate and describe my invention incorporated in a lathe wherein the work piece, except for rotation about its center, remains stationary and the tool is moved transversely and longitudinally thereof. It will be evident that my invention is applicable to a wide variety of machine tools and that when I speak of relative movement between the tool and work piece I include either an arrangement where the tool is stationary and the work piece is moved, or where the work piece is stationary and the tool is moved, or a combination of the two.

Figure 1:
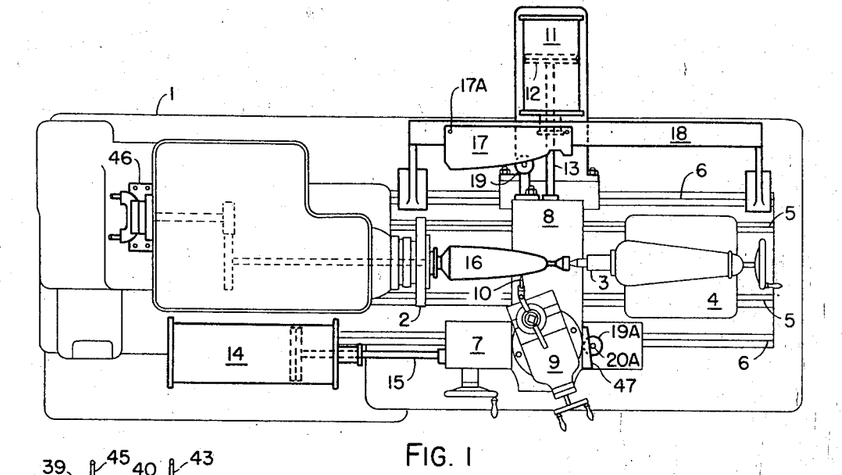
Fig. 1 is a plan view of an engine lathe illustrating the application of my invention thereto.

Referring now to Fig. 1, I show my invention applied to an engine lathe 1 having a head stock 2 adapted to be rotated by any suitable means. A carriage 4 is movable longitudinally along the bed of the lathe in suitable ways 5 and supports the tail stock 3. Also movable longitudinally along the bed of the lathe in suitable ways 6 is a carriage 7 upon which is mounted a cross-slide 8 movable on ways transversely of the bed of the lathe.

The cross-slide 8 is provided with an adjustable tool support 9 in which is secured a tool 10. Transverse movements of the tool 10 are produced through the agency of a hydraulic cylinder 11 having a piston 12 adapted to position the cross-slide 8 through the agency of a piston rod 13. Longitudinal movements of the tool 10, that is movements of the tool parallel to the bed of the lathe in a longitudinal direction, are produced by means of a hydraulic cylinder 14 having an operating piston rod 15.

Supported by the head stock 2 and the tail stock 3 is a work piece 16 which for illustrative purposes is shown as being formed to a parabolic shape by the tool 10. This particular shape has no significance, it being apparent as the description proceeds that by my invention the work piece 16 may be formed automatically to any desired contour. The master template or cam 17 is rigidly held in parallelism to the work piece 16 upon any convenient extension 18 of the lathe bed. The profile of the master template 17 is the contour which it is desired to reproduce upon the work piece 16. In Fig. 1 the shape of the work piece 16 follows in general a parabolic function merely as an example. For contacting and following the profile of the master template 17 I provide a tracer assembly 19 rigidly mounted on and movable with the cross-slide 8. The tracer assembly 19 is shown in larger and more detailed fashion in other figures of the drawing as having a vertical extension 20 adapted to contact the front edge or profile of the master template 17. A body member or housing 21 is adjustably mounted to the cross-slide 8 and the tracer extension or arm 20 is carried with the body 21.

Inasmuch as the tracer assembly forms a particular feature of my present invention, it will be described in greater detail in connection with Figs. 4-11 inclusive. Suffice it to say now that the tracer arm 20 continually scans the profile of the template 17 and controls the bleed to atmosphere of a substantially constant pressure supply of compressed air. The variable bleed or rate of flow of air to the atmosphere produces corresponding or proportional changes in back pressure or pressure of the air effective to cause a positioning of the piston rods 13 and 15 for transverse and longitudinal movements respectively of the tool 10.

Figures 2, 3:
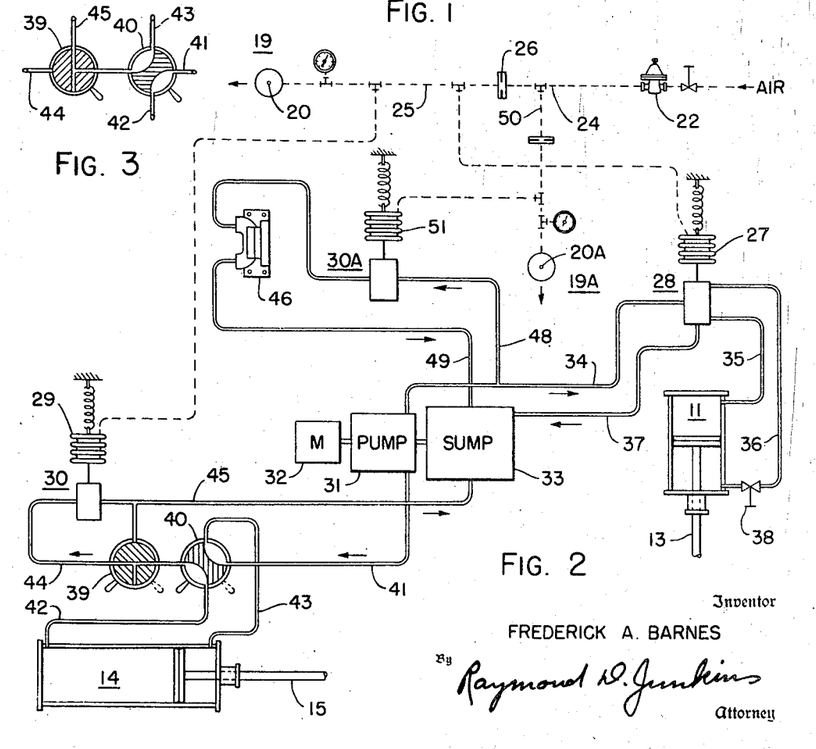
Fig. 2 is a diagrammatic illustration of the pneumatic and hydraulic control circuits employed in the embodiment of my invention shown in Fig. 1.
Fig. 3 is a transfer valve arrangement of Fig. 2.

In Fig. 2 I have shown diagrammatically the pneumatic and hydraulic circuits for controlling the servo-motors 11 and 14 by the tracer 19 in such manner that the motor 11 will position the cross-slide and consequently the tool 10 transversely of the lathe, or in other words toward or away from the work piece 16 as the tool is traveling longitudinally along the work. The action is such that if the contacted edge of the master template 17 is a straight line parallel to the axis of the work piece 16, then the work piece 16 will be turned to cylindrical form. If the contacted edge of the template 17 is a straight line, but inclined to the axis of the work piece 16, then the work piece 16 will be shaped to a taper. The particular showing of Fig. 1 is in general a parabolic curve on the contacted edge of the template 17, and thus the form which is to be produced on the work piece 16.

Air under pressure from any convenient source is passed through a pressure regulator 22 to a header 24 from which a branch 25 leads through an orifice 26 to the tracer assembly 19. As the discharge from the tracer 19 to the atmosphere varies, the pressure in the branch 25 between the orifice 26 and the tracer assembly 19 will vary, and such controlled air pressure representative of changes in contour of the template 17 is effective upon a bellows 27 of a pilot valve assembly 28 and simultaneously upon a bellows 29 of a fluid resistance assembly 30. The pilot valve 28 and fluid resistance 30 are fully described and claimed in the said copending applications of Barnes and Johnson.

I show an oil pump 31 driven by a motor 32 and drawing its supply of oil from a sump 33. Oil under pressure is supplied the pilot valve 28 by the pump 31 through a pipe 34. From the pilot valve 28 oil is supplied to one end or the other of the hydraulic motor 11 through the pipes 35 or 36. Drainage from the pilot 28 is returned to the sump 33 through a pipe 37. In the pipe 36 I show a hand adjustable valve 38 for variably throttling the flow of oil therethrough and thus controlling the basic rate of travel of the piston rod 13. Within any preselected range of speed of piston travel the relay 28 not only controls the direction of piston travel, but also the speed within said range.

In connection with the hydraulic motor 14 and adjustable fluid resistance 30 I provide switching valves 39 and 40 arranged to be moved together to either a "normal" or a "rapid traverse" position of operation of the servo-motor 14. The valves 39 and 40 are shown in Fig. 2 in the "normal" operating position. Oil under pressure from the pump 31 is forced through a pipe 41, the valve 40, and a pipe 43 to one end of the hydraulic motor 14. Oil from the other end of the motor passes through a pipe 42, the valve 40, the valve 39, a pipe 44, the adjustable fluid resistance 30, and the pipe 45 to the sump 33. The regulation of the variable resistance 30 determines the rate of flow of oil through the pipe 42, and consequently the rate of travel of the piston rod 15 toward the left in the drawing. Thus the rate of longitudinal travel of the tool 10 along the work piece 16 is controlled by the variable resistance 30 to passage of oil therethrough from the left-hand end of the motor 14.

In Fig. 3 I show the passage relation of the switching valves 39, 40 for a "rapid return" of the piston rod 15 from left to right of Fig. 2. That is for a rapid return of the tool to the beginning of its working travel. Oil from the pump 31 passes directly through the pipe 41, the valve 40 and the pipe 42; while oil from the right-hand end of the motor 14 passes directly through the pipe 43, valve 40, the valve 39, to the pipe 45 and sump 33. Thus on the rapid return of the piston rod 15 there is no throttling of its speed of travel by the variable resistance 30, and thus the tool is traversed to the right at maximum speed.

In general the operation of the system illustrated in Figs. 1, 2 and 3 is as follows. If the contacted edge of template 17 is a straight line parallel to the axis of the work 16 the air pressure established within the pipe 25 is such that the bellows 27 and 29 (and the movable parts of the assemblies 28, 30 positioned thereby) provide a normal condition of operation. The pilot valve 28 locks oil in the pipes 35, 36 so that the piston rod 13 is not moving, and the tool travels a cutting path parallel to the axis of the work piece 16. At the same time the variable fluid resistance 30 is in a position to provide a normal speed of travel of the piston rod 15 from right to left on the drawing, thus moving the tool 10 along the work at a uniform normal rate.

If the profile of the template 17 recedes from the axis of the work piece, or advances toward the axis of the work piece, the air pressure within the pipe 25 is correspondingly varied in proper direction to increase or decrease the air pressure within the bellows 27 and 29, and to cause a corresponding positioning of the movable element of the pilot valve 28 and fluid resistance 30. Such movement causes the hydraulic motor 11 to position the tool toward or away from the axis of the work piece 16, and thus reproduce upon the work piece 16 the contour of the master template 17. At the same time any departure (in either direction) of the movable element of the variable resistance 30 from normal position will increase the resistance to oil passage therethrough and tend to slow up travel of the piston rod 15. Thus longitudinal travel of the tool 10 from right to left on the drawing will be at a speed slower than the normal speed depending upon the rate of travel of the tool 10 toward or away from the axis of the work piece 16. If, for example, the profile of the template 17 includes a shoulder at a right angle with the axis of the work piece 16, then there will be a complete stoppage of longitudinal travel of the tool 10 while the tool is advancing directly toward the axis of the work piece or is receding directly therefrom. Movement of the tracer arm 20 either toward or away from the contacted edge of the template 17 from a normal or neutral position results in a decrease in speed of travel of the tool 10 in its longitudinal direction from its normal speed of travel and irrespective as to whether the tool is advancing toward the axis of the work piece or is receding therefrom.

After complete travel of the tool has been accomplished from right to left, then a rapid return of the tool to the right may be accomplished by moving the switching valves 39, 40 to the position shown in Fig. 3 wherein the connections to the cylinder 14 are reversed and the variable resistance 30 is made non-effective.

The system which I have just described in connection with Figs. 1, 2 and 3 is in general a two-element control wherein the lathe tool is positioned both transversely and longitudinally of the work piece. It will, of course, be seen that either element may be employed without necessarily employing the second element. For example, a lathe or similar material forming machine may have the tracer assembly 19 control only the cross feed of the tool or only the longitudinal travel of the tool, or the two combined as I have just described. It may, however, in certain instances be preferable to include a third element, namely, a control of the speed of rotation of the work piece 16 so that the linear cutting speed of the tool will remain unchanged regardless of the diameter of the work piece at which the tool is cutting. In other words, so that the speed of rotation of the work piece 16 will be different when the tool 10 is cutting at a larger diameter than it is when the tool is cutting at a smaller diameter. To illustrate such a possibility I have indicated in Fig. 1 an oil motor 46 for rotating the work 16 and under the control of a tracer assembly 19A which may be mounted on and longitudinally moved with the carriage 7. On the cross-slide 8 I locate a cam surface 47 movable with the tool 10 and relative to the tracer arm 20A of the tracer assembly 19A so that the tracer arm 20A is deflected by the cam 47 an amount indicative of the transverse position of the tool 10 relative to the axis of the work piece 16.

As explained in connection with Fig. 2 the tracer assembly 19A may control a variable fluid resistance 30A in the supply line 48 leading from the pump 31 to the motor 46, or in the discharge line 49 between the motor 46 and the pump 33, so that the speed of the motor 46 will depend entirely upon the position of the tracer arm 20A relative to the assembly 19A, and consequently will depend upon the transverse location of the cutting tool 10. The tracer assembly 19A is connected to the air header 24 through a branch 50 and applies a regulated air pressure to the bellows 51 of the fluid resistance 30A, such pressure bearing a definite relation to the transverse position of the tool 10 relative the axis of the work piece 16. In other words, as the diameter at which the tool 10 is cutting increases or decreases the speed of rotation of the work piece 16 will correspondingly decrease or increase respectively. It will be apparent that this third element of control may be included on the lathe of Figs. 1, 2 and 3 either alone or in combination with either or both of the two elements of transverse and longitudinal tool travel.

I will now describe in greater detail the tracer assembly 19 with reference to Figs. 4–11 inclusive.

Figure 4:
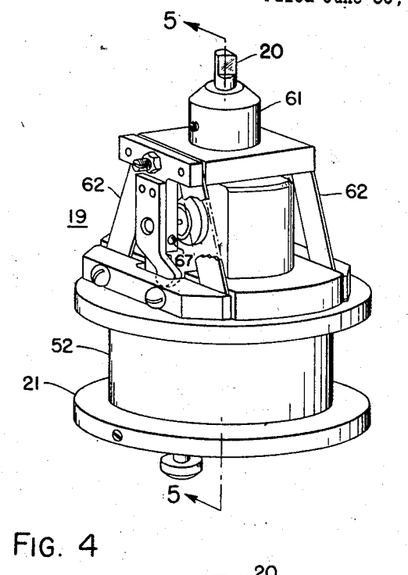
Fig. 4 is a perspective drawing of one embodiment of my invention.
Figure 5:
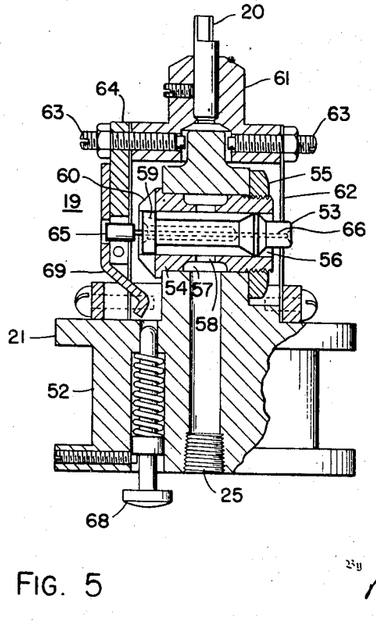
Fig. 5 is a sectional elevation of Fig. 4 along the line 5—5 in direction of the arrows.

Referring in particular to Figs. 4 and 5, I show therein a perspective and a sectional elevation substantially to scale of a tracer assembly which I have found to be satisfactory and which includes certain features which I believe are novel and constitute invention. The body member 21 may be made of cast iron for example, and is provided with a machined cylindrical surface as at 52 for adjustably mounting on the cross-slide 8 by means of an appropriate clamp in any position of possible 360° rotation. As shown in Figs. 4 and 5, and the assembly of Fig. 1, the relatively sharp edge of the tracer arm 20 scans the edge of a relatively thin plate template 17. The tracer arm may assume any convenient cross-sectional shape, as for example a generally triangular shape as illustrated in Figs. 4 and 5, or may comprise a small diameter cylindrical rod. The entire assembly 19 may be rotated 180° on the surface of 52 for boring operations or inside turning for example. An upwardly extending portion of the body member 21 houses a valve sleeve 54 held thereto by a lock nut 55. Within the valve sleeve 54 is a valve member 53 positionable axially in the bore 56 of the valve sleeve. Air at substantially constant pressure of 45 p. s. i. is available from the pipe 25 in an annulus 57 and through one or more openings 58 to the interior of the stationary valve sleeve 54.

The valve member 53 is provided near its right-hand end (on the drawing) with a sealing guide portion slightly tapered toward each end. With air under a pressure of approximately 45 p. s. i. in the bore 56 there will be a continual constant bleed of air to the atmosphere toward the right on the drawing past the sealing guide portion. Due to the shape of this sealing portion such bleed will tend to center the portion in the bore of the sleeve 54 forming a lubricating film of minute thickness of flowing air surrounding the greatest diameter of the sealing portion. The result is that the valve member 53 may be positioned axially of the sleeve 54 with a minimum of friction or pressure reaction. In its idle or uninfluenced position the valve member 53 is so adjusted that the valve portion 59 just seals the port end (left-hand) of the sleeve 54. Under this condition the pressure within the sleeve 54 is normally 45 p. s. i.

Under normal operating conditions, i. e. when the tracer arm 20 is scanning a straight portion of profile of the template 17 parallel to the axis of the work piece 16, the tracer arm 20 is deflected slightly toward the left (Fig. 5) and the movable valve member 53 is moved toward the left until the right-hand edge of the portion 59 has cleared the port or bore 56 of the valve sleeve 54 by .003 to .005 inch. Under this operating condition the valve portion 59 is guided by the fins 60 and there exists a bleed to atmosphere of air from the bore 56 through the clearance between the portion 59 and the end of bore 56 between the guide surfaces 60. Under such operating conditions a pressure of approximately 35 p. s. i. or a "normal" pressure exists in the bore 56 and in the pipe 25.

The tracer arm 20 is adjustably mounted in a cap structure 61 supported above the body member 52 by four substantially vertical leaf springs 62. The leaf springs are arranged in two pairs, the one pair straddling in truss construction the one end of the valve member 53 and the other pair straddling in truss construction the other end of the valve member 53. It will be apparent that the arrangement provides for a movement of the cap 61, through flexing of the springs 62, in either direction along a single prescribed path normal to the flat of the leaf springs. Stop screws 63 limit the travel in either direction of the cap 61 and tracer arm 20.

I provide means for varying the relation between the deflection of the tracer arm 20 and the amount of bleed to the atmosphere past the valve portion 59 and correspondingly the air pressure within the bore 56 for any given position of the tracer arm 20. Carried by the cap 61 is a downwardly extending arm 64 having a saw slot in its lower end and having an opening adapted to receive a cylindrical projection 65 of the valve member 53. The projection 65 is fastened to the valve member 53 at its far end by a relatively flexible steel rod 66 passing through the bored interior of 53. Adjustment of member 53 axially in the bore 56 is accomplished by loosening a holding screw 67 and sliding 65 in its moving arm 64.

Normally when the arm 20 is in its idle or undeflected position the valve portion 59 just seals off the end of the bore 56 and a pressure of approximately 45 p. s. i. exists within the bore 56 and in the pipe 25. Under a normal operating condition wherein the arm 20 is riding a straight portion of the template 17 parallel to the axis of the work piece, the arm 20 will be slightly deflected to the left and a bleed opening of approximately .003 to .005 inch will exist past the valve portion 59, thus dictating a pressure of approximately 35 p. s. i. in the bore 56. Further deflection of the tracer arm 20 to the left will increase the bleed past the valve portion 59 with consequent decrease in pressure within the bore 56 and pipe 25, whereas a lessening of the deflection or movement of the tracer arm 20 toward the right will tend to close off the bleed from the bore 56 and allow the pressure therein to build up toward the maximum of 45 p. s. i.

Referring back to Figs. 1 and 2, and taking certain arbitrary figures of air pressure within the pipe 25 as an example. Under a normal condition of operation wherein the profile of the template 17 is a straight line parallel to the axis of the work piece 16 (dictating a cylindrical turning of the work piece 16) a normal pressure of 35 p. s. i. will obtain in the pipe 25, within the bellows 27, and within the bellows 29. Such normal pressure positions the pilot 28 to a position wherein equal pressures are applied through the pipes 35, 36 and the piston rod 13 does not move. Therefore the cross-slide 8 does not advance or retract and the tool 10 remains at the same distance from the axis of the work piece 16. At the same time this "normal" pressure of 35 p. s. i., effective upon the bellows 29, positions the variable fluid resistance 30 to its maximum opening wherein least restriction or resistance to flow is experienced to the fluid leaving the cylinder 14 through the pipe 42 to the sump 33. Under this condition a uniform maximum speed of travel of the piston rod 15 toward the left is accomplished, and thus the tool 10 travels axially of the work 16, turning it to cylindrical form. As previously explained, under this condition of operation the tracer arm 20 is in contact riding on the edge of the template 17 and slightly deflected toward the left (Fig. 5) relative to the body 52. This produces a movement of the valve member 53 toward the left to an extent where a minute clearance exists between the end of the valve portion 59 and the bore 56, thus providing a bleed jet of air to the atmosphere past the guide vanes 60 and relieving the pressure within the pipe 25 to approximately 35 p. s. i. Obviously this "normal" pressure may be varied somewhat by adjustment of the projection 65 in the arm 64 to move the valve member 53 slightly to the right or to the left in the bore 56 for a given deflected position of 20.

Assume now that the profile of the template 17 departs from a straight line parallel to the axis of the work piece and becomes a straight line inclined to said axis in a direction to demand the turning of a uniform taper on the work piece of gradually decreasing diameter. As the tracer arm 20 in moving toward the left meets a decreasing resistance, it tends to return toward the right (Fig. 5) toward its idle or undeflected position. This results in a tendency for the valve member 53 to move toward the right and decrease the bleed between the portion 59 and the end of the bore 56. The result is a building up of pressure within the pipe 25 from 35 p. s. i. toward 45 p. s. i. Such increase in pressure, effective upon the bellows 27, positions the pilot valve 28 in a direction which through unbalance of pressures in the pipes 35, 36 causes the piston rod 13 to move the cross-slide 8 and tool 10 toward the axis of the work piece 16, thus tending to decrease the diameter at which the tool 10 is cutting. At the same time this movement of the cross-slide 8 carries the body 21 in a direction to follow up the tracer arm 20 and tend to restore the pressure within the pipe 25 to the "normal" pressure of 35 p. s. i., which is the pressure wherein travel of the piston rod 13 would cease. Inasmuch as the profile of the cam 17 which the tracer arm 20 is following continues to slope away from the axis of the work piece 16, the tracer arm 20 continues to move toward the right (Fig. 5) and the body 21 continues to follow it up so that a definite pressure within the pipe 25 is established at some value between 35 p. s. i. and 45 p. s. i. representative of the slope of the profile of the cam 17, and thus representative of the desired taper being turned on the work 16.

Conversely, should the profile of the cam 17 be a straight line dictating the turning of a taper of increasing diameter as the tool travels toward the left, then the tracer arm 20 would be deflected further toward the left, resulting in a greater bleed past the portion 59 to the atmosphere and a lowering of the pressure in the pipe 25 below 35 p. s. i. to a lower limit of about 20 p. s. i. Such lowering of the pressure would result in the piston rod 13 moving the cross-slide 8 and tool 10 away from the center line of the work 16 to cut at an increasingly greater diameter and produce an increasing taper toward the left. Again the body 21, carried by the cross-slide 8, would attempt to follow up the continued movement of the tracer arm 20 toward the axis of the work piece 16, resulting in an established bleed opening and pressure within the pipe 25 representative of the slope of the taper dictated by the template 17.

As previously mentioned, whenever the profile of the template 17 departs from a straight line parallel to the axis of the work piece 16, i. e. whenever the pressure within the pipe 25 departs in either direction from its "normal" pressure of 35 p. s. i. the variable fluid resistance 30 decreases the rate of travel of the piston rod 15 toward the left from its normal or maximum rate of travel. Thus, as the turning operation on the work 16 departs from cylindrical, the longitudinal travel speed of the tool 10 is decreased. To carry this to an extreme, if a shoulder normal to the axis of the work 16 is encountered on the profile of the template 17, the longitudinal travel of the tool 10 would cease entirely while the tool 10 is advancing directly toward the axis of the work piece or is receding therefrom. It is obvious that this must occur, for such a shoulder could not be turned with the tool advancing longitudinally of the axis of the work piece.

When the travel of the tool toward the left along the work has been accomplished, it is desired to retract the assembly 19 from the template 17 and tool 10 from the work piece 16 toward the operator an inch or two prior to accomplishing a high speed return of the cross-slide 8 to its starting position at the right. Such high speed return is accomplished as previously pointed out through operation of the switching valves 39, 40. To accomplish such a retraction of the cross-slide 8 manually I provide on the assembly 19 a plunger 68 (Fig. 5) spring forced normally to a downward position, but adapted to be hand pressed upwardly to engage the cam lower end of an arm 69 depending from the arm 64. Upward movement of the plunger 68 forces the arm 69, the arm 64 and the valve member 53 toward the left an amount limited only by the preset position of the limiting screw 63. Such movement produces a maximum bleed to the atmosphere of pressure in the bore 56 and reduction of pressure within the pipe 25 to a minimum of 20 p. s. i. Such maximum decrease in pressure in the pipe 25 produces a movement of the cross-slide 8 toward the operator at maximum speed. At the same time this maximum decrease in pressure within the pipe 25 positions the variable resistance 30 to a shutoff position stopping further travel of the tool 10 toward the left. The operator switches the valves 39, 40 taking control of the servo-motor 14 away from the variable resistance 30 and accomplishing travel of the cross-slide 8 toward the right at a maximum speed.

It is appreciated by those familiar with the art that the edge of the tracer arm 20, which contacts the profile of the template 17, should approximate the shape of the cutting tool. In turning cylindrical or slow taper contours it is usual practice to use a relatively sharp-nose tool. For turning cannelures a round-nose tool is usually used, whereas for cleaning up straight wall shoulders or undercuts a duck-bill tool is used. I have illustrated in Figs 4 and 5 that the tracer arm 20 has a contact portion approximating the shape of the tool which would be used for cylindrical or slow taper turning.

In cylindrical turning the assembly 19 is so mounted with reference to the cross-slide 8 that the flat of each leaf spring 62 is parallel to the axis of the work piece 16, and thus to the longitudinal travel of the cross-slide 8. With such mounting the full flexing of the leaf spring is effective. This presupposes that the bisecting axis of the contact edge of the tracer arm 20 is normal to the flat of the spring 62, parallel to the axis of 53, and normal to the longitudinal travel of the assembly 19. For other than cylindrical turning the assembly 19 is angularly moved on its machined surface 52 to use a component force away from parallel with the flat of the springs 62.

The shape of the tracer edge usually approximates the shape of the cutting tool although it will be understood that the shape of the tool as well as the shape of the tracer edge are designed to fit the job and may vary from each other. I preferably rotate the assembly 19 on its machined surface 52 until the flats of the springs 62 are about 15° away from the axial line of travel.

The tracer assembly of Figs. 4 and 5 provides a direct drive between the feeler 20 and the valve member 53 with no interposed bearings, knife edges, or the like, and substantially no angularity of motion. The ratio of motion does not change, there is no magnifying linkage, and a maximum of simplicity and directness of action exists. In other words, the positioning of the feeler, due to the parallel spring mounting, is substantially straight line with resultant similar position of the valve member 53. Regardless of the thickness of the template or plate 17 the contacting edge of the feeler 21 will not rock or roll around said edge, thus introducing an error due to angularity in the positioning of the valve member 53. There is therefore no tendency to wear the edges of the template and more accuracy of repetition results. If the template constitutes an actual sample, then the feeler contact edge may be lengthened to engage at a line on the horizontal diameter of the sample and no adverse effect will be felt upon the motion of the valve member 53, as there is no necessity of a definite or predetermined ratio of length of feeler arm to travel of the valve member.

Figures 6, 7, 10, 11:
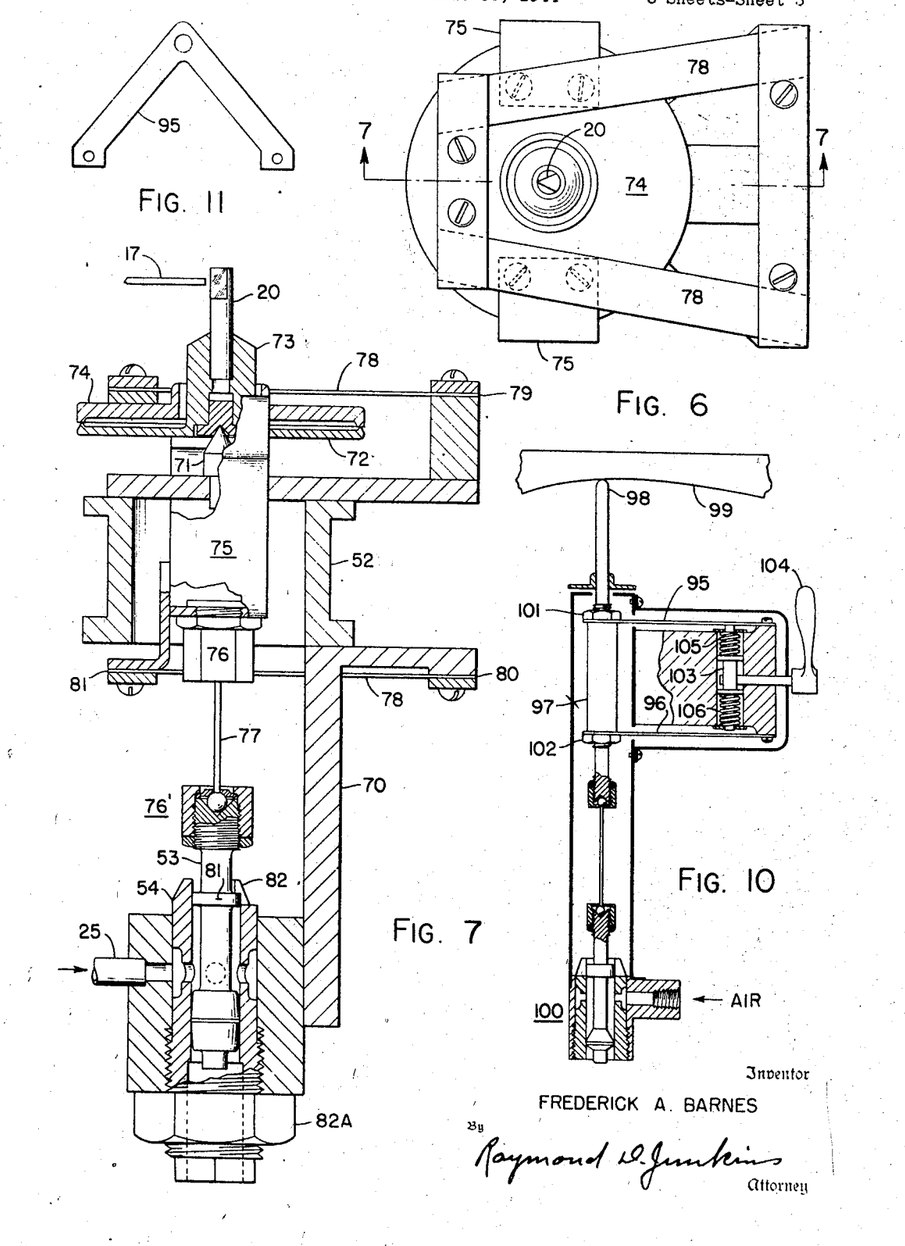
Fig. 6 is a plan view of another embodiment of my invention.
Fig. 7 is a sectional elevation of the arrangement illustrated in Fig. 6 taken along the line 7—7 in the direction of the arrows.
Fig. 10 is a diagrammatic drawing of another embodiment of the invention.
Fig. 11 illustrates a part of Fig. 10.

Referring now to Figs. 6 and 7 a body member 70 is shown in somewhat diagrammatic fashion as having a tracer arm 20 at its uppermost extremity and supporting at its lower end a valve sleeve 54 in which is positionable a valve member 53. The assembly has a machined surface 52 cylindrical in shape for adjustably mounting the entire assembly on the cross-slide of the lathe. Mounted on the body member 70, axially in line with the feeler arm 20 and valve member 53, is a bearing cone 71 upon which is positioned a lower wobble plate 72 having around its periphery an upturned knife edge. The plate 72 has an upwardly extending portion 73 in which is adjustably located the feeler arm 20. Normally resting on the lower plate 72 is an upper plate 74 having a raised flat edge portion engaging the knife edge periphery of the lower plate 72. The arrangement allows a wobble plate contact of minimum area between the plates 72 and 74 as the feeler arm 20 is deflected in any position around the bearing cone 71. Inasmuch as the upper plate 74 is so mounted as to move substantially vertically, the result of any deflection of the upper end of the tracer arm 20, with corresponding angular positioning of the lower plate 72, results always in an upward vertical positioning of the plate 74 from the position of rest shown in Fig. 7.

Suspended from the upper plate 74, through the medium of a yoke strap 75, is the upper assembly 76 of a connection with the valve member 53. The lower connection 76' is shown in section. The driving connection between the yoke 75 and the valve member 53 includes a positioning rod 77 having at either end a ball adjustably confined in the assembly 76 or 76'. The arrangement provides for positioning the valve member 53 through the strap 75 with a minimum of friction, misalignment, etc.

In my preferred embodiment I provide four flat or leaf springs 78 mounted with the flats horizontal in pairs. As clearly indicated in Figs. 6 and 7 the individual pairs are arranged in truss construction eliminating a possibility of edgewise motion of the leaf spring and providing for flexing in either direction along a given vertical path. The outer ends of the four leaf springs 78 are rigidly supported on the body member 70 as at 79 and 80. The flexible ends of the upper springs 78 are fastened to the upper plate 74 while the flexible ends of the lower pair of springs 78 are fastened to the yoke strap 75 as at 81. Inasmuch as the upper plate 74 is fastened to the strap 75 it is clear that leaf springs 78 are in fixed spaced relation at one end to the stationary body member 70 and in fixed spaced relation at the other end to the movable assembly including the plate 74, the yoke strap 75, the parts 76, 76', 77 and the valve member 53. Thus flexing of the springs 78 in either direction along a vertical path results in vertical positioning of the valve member 53. Such flexing of the springs 78 is of course accomplished through wobbling of the lower plate 72 around the bearing cone 71 produced by deflection of the upper end of the tracer feeler 20. Deflection of the feeler 20 in any direction results in a lifting of the upper plate 74 and correspondingly a lifting of the valve member 53 with resulting increase in bleed of air to the atmosphere from the valve sleeve 54 with consequent lowering of pressure in the pipe 25.

I provide a possibility of adjusting the interrelation between the valve member 53 and the valve sleeve 54 as to the positioning of the land 81 relative the end of the sleeve 54 between the guide vanes 82 by threading the sleeve 54 upwardly or downwardly and tightening the lock nut 82A.

In the "idle" position of the assembly (as shown in Figs. 6 and 7) the feeler 20 is not contacting the profile of the template 17 and is, therefore, vertical relative the bearing cone 71. The plate 72 is seating against the plate 74 in peripheral contact, and desirably there is a minimum bleed of air to the atmosphere past the land 81. Such minimum bleed establishes a pressure in the control pipe 25 at approximately 45 p. s. i. This is the same condition as encountering a straight drop off shoulder on the template wherein the feeler 20 would theoretically not be in contact with the profile of the template 17 because said profile had dropped out from under it as a straight shoulder.

Under the "idle" condition of high pressure and low bleed the action on the bellows 27 and 29 is such that there would be no longitudinal travel but a maximum rate of transverse travel of the tool inwardly toward the work and of the feeler toward the template surface until it engaged same.

Upon engagement of the feeler 20 with the template profile the feeler is deflected toward the right (Fig. 7) with the plates 72, 74 pivoting at the left-hand edge across the bearing cone 71. This results in a raising of the plate 74 and valve member 53, thereby increasing the bleed past the land 81 to the atmosphere. Equilibrium is established under a "normal" condition as would be attained when the tracer feeler 20 is deflected a normal amount in contact with a straight section of the profile 17 parallel to the axis of the work piece. Under this normal condition of increased bleed and lowered pressure within the pipe 25, the pressure is approximately 35 p. s. i. and no transverse motion is accomplished, but maximum rate of longitudinal travel, such as in cylindrical turning.

When the tracer feeler is not contacting the template it is in what I term an "idle" or uninfluenced position with respect to the tracer body. Under this condition the air bleed valve is adjusted to produce motion of the tracer assembly toward the template. The movement continues until the template contacts the feeler and deflects the latter slightly toward a "normal" position. Such deflection changes the bleed rate to a value stopping transverse movement of the cross-slide, tool and tracer assembly, while producing longitudinal movement at maximum rate. The result is cylindrical turning if the tool is contacting the work and will persist as long as the feeler scans a straight profile on the template parallel to the axis of the work piece.

Departure of the profile dictating an inward movement of the tool reduces the deflection of the tracer arm, thus increasing the control pressure, decreasing the rate of longitudinal travel and increasing the transverse travel in an inward direction. Conversely, if the profile of the template 17 demands cutting at a larger diameter the deflection of the feeler 20 is increased with resulting decrease in control pressure, reversing the transverse motion so that the tool and tracer arm move outwardly and tending to slow down the longitudinal travel at the same time. It will thus be observed that either an increase or a decrease in control pressure, corresponding to a greater or a lesser deflection of the feeler 20, from "normal" position results in an increasing of resistance to flow of fluid through the pipe 42 and thus a decrease in rate of longitudinal travel.

I preferably provide a 1-1 ratio between the distance of the feeler 20 from the pivot 71 to the contact with 17 and the radius from pivot 71 to the contact between wobble plates. Inasmuch as 20 is the friction arm, any lengthening of 20 relative to such radius may produce wobble drag between the plates 72, 74 and stuttering action.

The particular arrangement depicted in Figs. 6 and 7 allows somewhat wider latitude of machining round corners, square shoulders and slow and fast tapers, on a single passage of the feeler over the template and of the tool over the work piece. The facing or pointing of the contact edge of the feeler 20 does not have to be angularly varied in cutting both sides of a cannelure or stepped shaft shoulders. The tracer assembly is extremely sensitive and is accurate on substantially all changes in profile of the template without adjustment.

Figure 8:
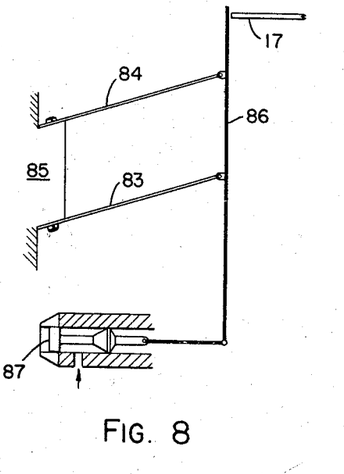
Figs. 8 and 9 are schematic diagrams of a further arrangement.
Figure 9:
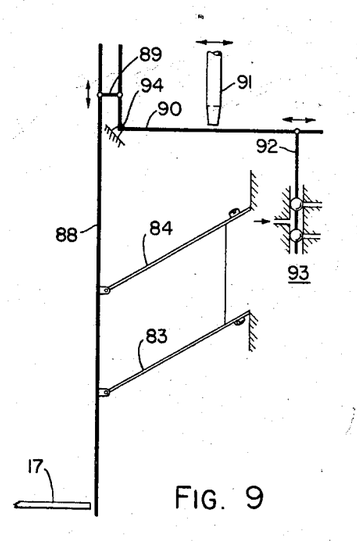

In Figs. 8 and 9 I show schematically further parallel spring mounting arrangements advantageous under certain operating conditions.

In Fig. 8 a pair of leaf springs 83, 84 are rigidly supported at one end as at 85. They are angularly related to form a parallelogram with a bar 86, one end of which is adapted to scan the template 17. The lower end of the vertical member 86 is pivotally connected to position the bleed valve 87 substantially directly with movement of the bar 86 relative to the support 85 through engagement of the bar 86 with the template 17.

In Fig. 9 a somewhat similar arrangement is illustrated wherein horizontal positioning of the bar 88 through engagement with the template 17 acts through a link 89 to angularly position a bell crank 90 which may form a baffle against a jet of air bleeding to the atmosphere from a nozzle 91. Alternatively the bell crank 90 may vertically position the stem 92 of an air pilot 93. Provision is made for vertically moving the link 89 to change the ratio of movement of the horizontal member of the bell crank 90 with respect to deflection of the bar 88 under contact with the template 17. Likewise provision is made for adjusting the nozzle 91 relative to the pivot 94 and/or positioning the pilot 92, 93 relative to the pivot 94 to change the sensitivity of the system.

In Figs. 10 and 11 I depict a further arrangement of parallel spring supporting, wherein an endwise tracer has adjustable biasing means on the leaf spring loading.

The parallel leaf springs 95, 96 support for vertical movement a member 97 provided at its one end with a tracer feeler 98 adapted to scan the profile of a template 99. At the other end of the assembly 97 is a bleed valve 100 similar in general construction to those previously described. The assembly 97 is provided with adjustments 101, 102 permitting adjustment of the bleed valve cutoff point.

A particular feature of the arrangements of Figs. 10 and 11 is the provision of biasing means for the leaf springs 95, 96 constituting an eccentric 103 positionable through the agency of a hand lever 104 for varying the effect of coil springs 105, 106. The springs 95, 96 may be single individual leafs or may take a form such as that illustrated in Fig. 11.

In general I have illustrated and described certain preferred arrangements of tracer mechanisms for use in contour control of machine tools. While described with specific reference to turning operations on an engine lathe, it will be appreciated that tracers of the type forming the present invention may be used equally as well in connection with milling machines, die sinking work, and the like. In fact in connection with the relative positioning of a tool or work piece irrespective as to whether the work piece is stationary and the tool movable, or vice versa, or a combination of the two. I am particularly concerned in the present application with an arrangement and construction of tracer mechanism and the particular advantages obtainable through the use of parallel motion parts and the mounting and support by flexible leaf springs.

While I have chosen to illustrate and describe certain preferred embodiments of my invention it will be understood that I do not desire to be limited thereto.

What I claim as new, and desire to secure by Letters Patent of the United States, is:

1. A tracer mechanism for a machine tool having a relatively movable work piece and tool and having a pattern with a shape corresponding to the desired shape of the work piece, comprising in combination, a feeler arm adapted to scan the pattern, a structure having near one end a cone pivot and near the other end the stationary part of a control couple, the pivot and part in axial alignment, a pair of opposed discs lying in a plane normal to the said axial alignment and normally contacting at their peripheries, one disc carrying the feeler and pivotable about said cone, the movable part of the control couple carried by the other disc, and parallelogram motion means fastened at one end to said structure and at the other end to the said other disc and movable part whereby deflection of the feeler in any direction about said cone moves the movable part axially in the stationary part of the couple.

2. The combination of claim 1 wherein the parallelogram motion means comprises a plurality of leaf springs whose flats are normal to said axial alignment.

3. The combination of claim 1 wherein the control couple comprises a fluid valve discharging to the atmosphere.

4. A tracer mechanism for producing a control effect corresponding to the shape of a pattern, comprising, a follower mounted for angular movement about a cone point and having a feeler part scanning the pattern as the tool traverses the work, the follower comprising a wobble disc having an upturned edge around its periphery, a second wobble disc inverted over the first wobble disc and adapted to make peripheral contact therewith, means for producing a control effect positionable by said second wobble disc, and a plurality of leaf springs dictating straight line motion of said second wobble disc and said means upon angular motion of the feeler about the cone.

5. The combination of claim 4 wherein the means for producing a control effect comprises a jet discharging fluid to the atmosphere.

6. The combination of claim 4 wherein the control effect is a fluid pressure varying with the rate of flow of a fluid discharging to the atmosphere.

7. A tracer mechanism for scanning a pattern comprising, in combination, a feeler arm adapted to scan the pattern, a valve casing communicable with the atmosphere, passage means for connecting said valve casing in communication with a source of pressure fluid, a valve member in said casing for controlling the rate of fluid discharge to the atmosphere, leaf springs fixed at their opposite ends to said feeler arm and to said valve casing, and means connecting said valve member to said leaf springs at points movable relative to said casing as said springs are flexed, said valve member being positioned in said casing to cut off communication with the atmosphere when said leaf springs are unflexed.

8. A tracer mechanism for producing a control effect corresponding to the shape of a pattern comprising, in combination, a tracer member adapted to scan the pattern, a valve element having passage means communicable with the atmosphere, means for supplying pressure fluid to said passage means, a valve member cooperating with said valve element for controlling the escape of pressure fluid through said passage means to the atmosphere, yielding means supporting said tracer member for movement relative to said valve element, and means connecting said valve member to said tracer member for movement therewith, said connecting means being so arranged as to support said valve member in a position to reduce the escape of pressure fluid to a minimum when said yielding means are unflexed.

9. A tracer mechanism for producing a control effect corresponding to the shape of a pattern comprising, in combination, a tracer member adapted to scan the pattern, a valve sleeve communicable at its end with the atmosphere, means for supplying pressure fluid to the interior of said valve sleeve, a valve member having spaced portions cooperating with the walls of said valve sleeve for controlling the escape of pressure fluid to the atmosphere, yielding means supporting said tracer member for movement relative to said valve sleeve, and means connecting said valve member to said tracer member for movement therewith, said connecting means being such as to support said valve member normally in a position with one of its spaced portions just enclosing an end of said valve sleeve.

10. The combination of claim 8 including manually adjustable means for variably biasing said tracer member in one direction or another relative to said valve element.

11. The combination of claim 9 including manually adjustable means for moving said valve member positively relative to said valve sleeve to increase the escape of pressure fluid from the latter.

FREDERICK A. BARNES.

REFERENCES CITED

The following references are of record in the file of this patent:

UNITED STATES PATENTS

| Number | Name | Date |
|---|---|---|
| 1,982,161 | Gurney | Nov. 27, 1934 |
| 2,025,748 | Howe | Dec. 31, 1935 |
| 2,190,306 | Balsiger | Feb. 13, 1940 |
| 1,745,878 | Trumpler | Feb. 4, 1930 |
| 2,349,838 | Alexandersson | May 30, 1944 |
| 1,954,442 | Dall | Apr. 10, 1934 |
| 539,212 | Amet | May 14, 1895 |
| 2,007,232 | Wall | July 9, 1935 |